United States Patent
Salisbury et al.

(10) Patent No.: US 10,043,258 B2
(45) Date of Patent: Aug. 7, 2018

(54) CONVEYOR BELT MONITORING SYSTEM AND METHOD

(71) Applicant: Thermoteknix Systems Limited, Cambridge (GB)

(72) Inventors: Richard Salisbury, Cambridge (GB); Andrew Mitchell, Cambridge (GB)

(73) Assignee: Thermoteknix Systems Ltd., Cambridge (GB)

(*) Notice: Subject to any disclaimer, the term of this patent is extended or adjusted under 35 U.S.C. 154(b) by 152 days.

(21) Appl. No.: 15/076,898

(22) Filed: Mar. 22, 2016

(65) Prior Publication Data

US 2016/0314573 A1    Oct. 27, 2016

(30) Foreign Application Priority Data

Apr. 27, 2015    (GB) .................................. 1507124.4

(51) Int. Cl.
     *G06T 7/20*      (2017.01)
     *G06T 7/00*      (2017.01)
     (Continued)

(52) U.S. Cl.
CPC ............ *G06T 7/0004* (2013.01); *B65G 43/02* (2013.01); *G01J 5/0022* (2013.01); *G01J 5/026* (2013.01); *G01J 5/089* (2013.01); *G01J 5/10* (2013.01); *G06K 9/6267* (2013.01); *G06T 7/60* (2013.01); *H04N 5/33* (2013.01); *H04N 5/3692* (2013.01); *G01J 2005/0029* (2013.01); *G01J 2005/0077* (2013.01); *G06T 2207/10048* (2013.01);
(Continued)

(58) Field of Classification Search
CPC .... B65G 43/02; G01J 2005/0077; G01J 5/10; G06K 9/6267; G06T 2207/10048; G06T 2207/20024; G06T 2207/30164; G06T 7/0004; G06T 7/60; H04N 5/33; H04N 5/3692
USPC ......................................................... 348/164
See application file for complete search history.

(56) References Cited

U.S. PATENT DOCUMENTS

| | | | |
|---|---|---|---|
| 2003/0197126 A1* | 10/2003 | Sato ......................... | A24B 1/04 250/339.11 |
| 2007/0108288 A1* | 5/2007 | Caskey .................. | G01B 11/25 235/462.08 |

(Continued)

FOREIGN PATENT DOCUMENTS

FR      2397627      2/1979

OTHER PUBLICATIONS

Gupta et al, Thermal imaging for detecting thermal interface issues in assembly and reliability stressing (Year: 2006).*

(Continued)

*Primary Examiner* — Shan E Elahi
(74) *Attorney, Agent, or Firm* — Downs Rachlin Martin PLLC

(57) ABSTRACT

A conveyor belt temperature anomaly detection system, comprising: an infrared line scanner having one or more infrared detectors and arranged to scan the surface of a conveyor belt in a direction perpendicular to the direction of travel of the conveyor belt and to generate thermal image data in dependence on infrared radiation detected by the infrared detector; and a processing unit configured to process the thermal image data to identify temperature anomalies in the material travelling on the surface of the conveyor belt.

47 Claims, 6 Drawing Sheets

(51) Int. Cl.
  *G01J 5/10* (2006.01)
  *G06K 9/62* (2006.01)
  *G06T 7/60* (2017.01)
  *H04N 5/33* (2006.01)
  *H04N 5/369* (2011.01)
  *B65G 43/02* (2006.01)
  *G01J 5/02* (2006.01)
  *G01J 5/08* (2006.01)
  *G01J 5/00* (2006.01)

(52) U.S. Cl.
  CPC .............. *G06T 2207/20024* (2013.01); *G06T 2207/30164* (2013.01)

(56) References Cited

U.S. PATENT DOCUMENTS

| | | | | |
|---|---|---|---|---|
| 2010/0139383 | A1* | 6/2010 | Haswell | B60C 11/24 73/146 |
| 2013/0120561 | A1* | 5/2013 | Heintze | G01N 25/72 348/135 |
| 2013/0278771 | A1* | 10/2013 | Magoun | H04N 5/33 348/148 |
| 2015/0095254 | A1* | 4/2015 | Naber | B64F 1/366 705/330 |

OTHER PUBLICATIONS

Great Britain Search Report under Section 17, dated Oct. 13, 2015, in connection with GB1507124.4.
OonveyIR Scan Industrial Process Monitoring System, http://www.thermoteknix.com/products/cement/conveyir-scan-industrial-process-monitoring-system/ Thermoteknix.

* cited by examiner

CONVEYOR BELT MONITORING SYSTEM AND METHOD

FIELD OF THE INVENTION

This invention relates to conveyor belt monitoring and, in particular, a system and method for detecting temperature anomalies in materials passing over conveyor belts.

BACKGROUND TO THE INVENTION

There is a requirement in many industries to monitor the temperature of materials moving along conveyor belts. Conventionally, such monitoring is performed using a single spot or point pyrometer directed towards the belt. Such measurement techniques are of limited value as they only offer crude indications of temperature within the area upon which the spot is focussed. If the spot size is too large then small temperature anomalies, particularly those smaller than the spot size, may be missed. Alarms associated with point pyrometers are limited to an instantaneous local high/low threshold alert in the area of their spot which often lead to false or missed alarms.

SUMMARY OF THE INVENTION

According to a first aspect of the invention there is provided a conveyor belt temperature anomaly detection system, comprising: an infrared line scanner having one or more infrared detectors and arranged to scan the surface of a conveyor belt in a direction perpendicular to the direction of travel of the conveyor belt and to generate thermal image data in dependence on infrared radiation detected by the infrared detector; and a processing unit configured to process the thermal image data to identify temperature anomalies in the material travelling on the surface of the conveyor belt.

According to a second aspect of the invention there is provided a conveyor belt temperature anomaly detection system, comprising a two dimensional array of infrared detectors arranged to receive infrared radiation from the surface of a conveyor belt and to generate thermal image data in dependence on the received infrared radiation; and a processing unit configured to process the thermal image data to identify temperature anomalies in the material travelling on the surface of the conveyor belt.

According to a third aspect of the invention there is provided a method for detecting temperature anomalies in material transported on a conveyor belt, the method comprising: scanning an infrared line scanner across the surface of the conveyor belt in a direction perpendicular to the direction of travel of the conveyor belt; generating thermal image data based on infrared radiation received by the infrared line scanner from the material travelling on the conveyor belt; processing the thermal image data to identify temperature anomalies in material travelling on the surface of the conveyor belt.

According to a fourth aspect of the invention there is provided a method for detecting temperature anomalies in material transported on a conveyor belt, the method comprising scanning an infrared line scanner across the surface of the conveyor belt in a direction perpendicular to the direction of travel of the conveyor belt; generating thermal image data based on infrared radiation received by the infrared line scanner from the material travelling on the conveyor belt; processing the thermal image data to identify temperature anomalies in material travelling on the surface of the conveyor belt.

According to a fifth aspect of the invention, there is provided a computer readable storage medium having computer readable instructions stored thereon which, when executed by a processor in association with a thermal line scanner, perform method steps recited above.

BRIEF DESCRIPTION OF THE DRAWINGS

Embodiments of the present invention will now be described, by non-limiting example only, with reference to the accompanying drawings, in which.

DESCRIPTION OF EMBODIMENTS OF THE INVENTION

Embodiments of the present invention overcome the drawbacks associated with conventional spot pyrometer measuring techniques by utilizing an infrared line scanner to repeatedly scan the entire width of a conveyor belt as material travels along its surface. Data received from successive line scans can be assembled to form a thermal image of the belt and material situated thereon. Temperature anomalies present in the thermal image can then be identified and presented to a user and an appropriate course of action taken.

Embodiments of the present invention are described below primarily with reference to the monitoring of cement clinker passing over a conveyor belt, typically to and from process kilns. In cement processing plants, it is desirable to monitor for localised hot spots present in the clinker. It will, however, be appreciated that in other applications, it may be desirable to measure anomalous areas of low temperature, i.e. cold spots in any material travelling over a conveyor belt. Embodiments of the present invention may, therefore, also be used to identify areas of lower than average temperature or ("cold spots") in material passing over a conveyor belt.

Figure 1:
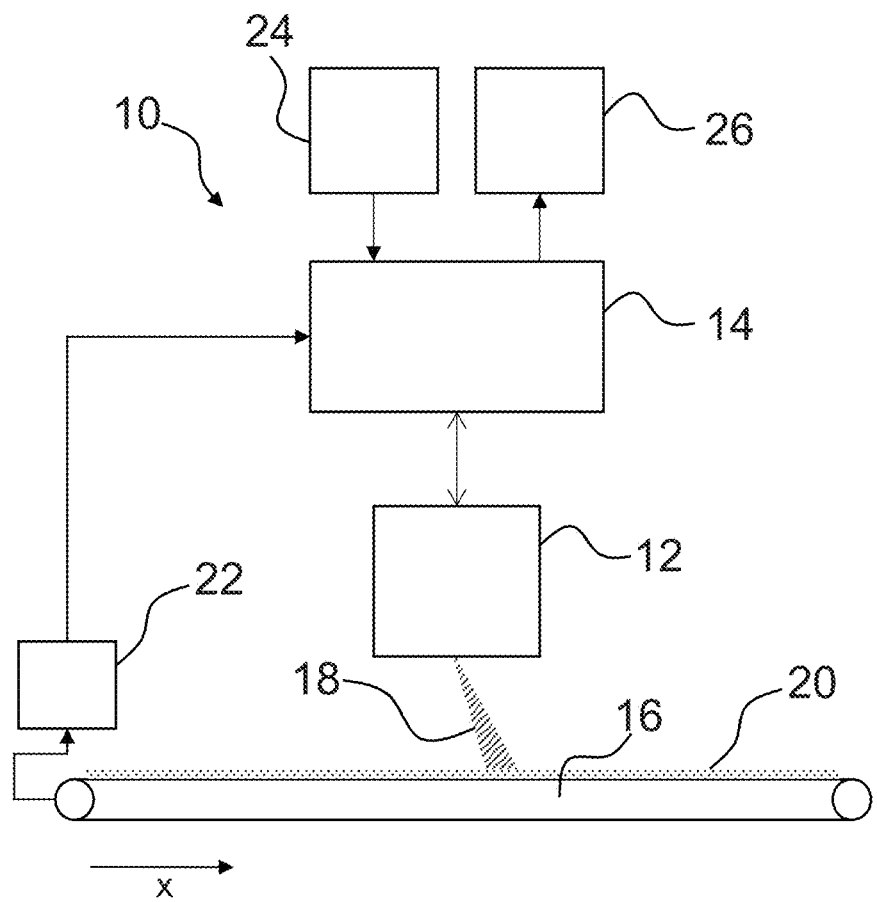
FIG. 1 is a schematic diagram of a conveyor belt anomaly detection system according to an embodiment of the present invention.
Figure 2:
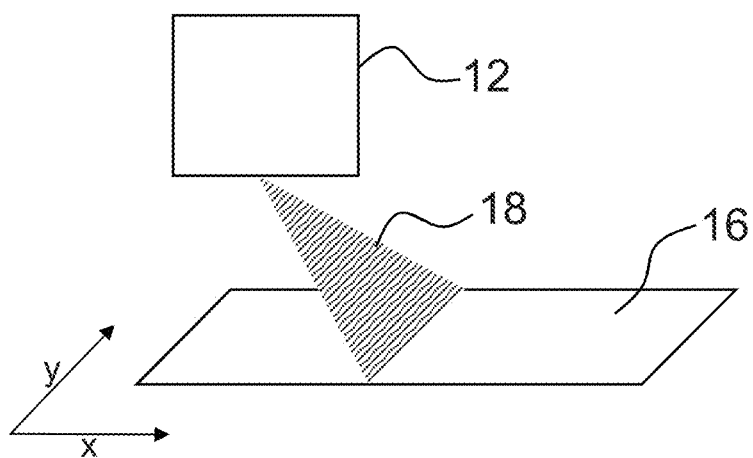
FIG. 2 is a perspective view of a line scanner of the conveyor belt anomaly detection system shown in FIG. 1 showing the viewing profile of the line scanner relative to the conveyor belt.

FIGS. 1 and 2 schematically illustrate a conveyor belt anomaly detecting system 10 in accordance with an embodiment of the present invention. The conveyor belt anomaly detection system 10 comprises an infrared scanner 12 and a processing unit 14 associated with and in communication with the scanner 12. Coupled to the processing unit 14 are a display 26 and an input device 24, such as a keyboard or touchscreen.

In use, the scanner 12 may be positioned above a conveyor belt 16 so as to scan the belt 16 over a scanning line 18 orientated across the width of the belt 16 in a "y" direction (denoted in FIG. 2), perpendicular to the belts longitudinal "x" axis. In the embodiments shown in FIGS. 1 and 2, the conveyor belt 16 operates so as to transport material along the length of the belt in the 'x' direction such that material moves from the left to right across the page.

The infrared line scanner 12, including one or more infrared detectors, is configured to repeatedly scan across the width of the belt 16, such that the spot focus of the infrared detector(s) sweeps across the surface of the belt 16 and any material situated thereon. The belt 16 may be scanned by the line scanner 12 either by physically moving the detector or by moving its focal point across the belt 16 using a device such as a rotating mirror, thus achieving a linear sequence of measurements across the belt 16. A two dimensional thermal profile of the belt 16 (including any material situated thereon) can then be generated by assembling the data received at the infrared detector(s) over multiple line scans. The system 10 may include a single infrared detector or multiple detectors. In the case of a single detector, the detector may be scanned so as to receive infrared radiation at the point of focus on the material as discussed above. In the case of multiple detectors, a linear array of detectors may be arranged so as to receive radiation being emitted across the entire width of the belt 16. The multiple detectors may be scanned in accordance with the methods described above in respect of a single detector, or alternatively they may be stationary but scanned electronically.

In any case, the infrared line scanner 12 may have a variable scanning angle, preferably of between 15° to 120°, thus allowing the scanner 12 to be mounted at a convenient height above the belt 16 whilst still capturing images of the entire belt width. Additionally, the scanner 12 is ideally directed such that the incident angle of focus of the detector on the belt is equal to 90° relative to the "y" plane of the belt 16, i.e. the surface of the belt along the length of the belt 16. It will be appreciated that other angles of incidence relative to the belt 16 are within the scope of the invention. However, preferably the angle should not be less than 60° relative to the "y" plane of the belt 16. Beyond this point, the effective emissivity of the material being scanned may reduce, particularly for more reflective materials travelling over the belt 16, such as metals. Furthermore, if the material travelling over the belt 16 has an uneven surface, then shadows will result in the processed image due to an oblique viewing angle of less than 60°.

Data received by the infrared line scanner 12 is communicated to the processing unit 14 via one or more busses. The processing unit 14 may be implemented as part of the line scanner 14 or separate from the line scanner 12. The processing unit 14 may he implemented in software running, for example, on a PC, or alternatively may be implemented in hardware using, for example, one or more digital single processors (DSPs) or applications specific integrated circuits (ASICs). Software running on the processing unit 14 may include instructions which, when executed, cause the line scanner 12 and infrared detector to operate in the manner discussed below. The processing unit 14 may include one or more local or remote storage facilities for storing captured infrared data received from the line scanner 12. Instructions run by the processing unit 14 may also he stored on the local or remote storage facilities associated with the processing unit 14.

In addition to receiving infrared data, the processing unit 14 may also receive speed data from a belt speedometer 22 coupled to the conveyor belt 16. Using this information, the processing unit 14 can generate an image of the belt 16 which is immune from distortion due to variations in speed of the belt 16 (the faster the belt 16 travels, the further apart the scan lines are assembled and vice versa).

A user may input, via the input device 24, one or more criteria for anomaly detection, as will be described in more detail below. Additionally, once generated, thermal images of the belt 16 may be displayed on the display 26 connected to the processing unit 14.

It will be appreciated that the image generated by the processing unit 14 is a scrolling image which increases in length with each scan of the belt 16. Accordingly, for the purposes of the detecting anomalies on the belt, the processing unit 14 may store a limited number of line scans in memory, thereby reducing storage requirements of the system. Additionally or alternatively, all line scan data received by the processing unit may be stored for later analysis in a manner known in the art.

The process for capturing and analysing line scan data received from the line scanner 12 by the processing unit 14 will now be described with reference to FIG. 3. The processing unit 14 receives scan lines at step 30 from the thermal line scanner. This data may be processed in realtime or stored in one or more buffers and/or permanent storage for later analysis. Additionally, at step 32, the processing unit 14 may also receive realtime belt speed data from the belt speed monitor 22. At step 34, the processing unit 14 then generates a thermal image from the scan lines using the belt speed data to calculate the scan line separation required to eliminate image distortion, each scan line separated by a distance which is proportional to the speed of the belt 16 at the time at which that particular scan was performed.

Once the adjusted thermal image has been assembled, the image may be filtered at step 36 to remove high frequency spatial information. Then, at step 38 temperature anomalies can be identified in the image relating to hot and/or cold regions present in material travelling over the belt 16.

Figure 3:
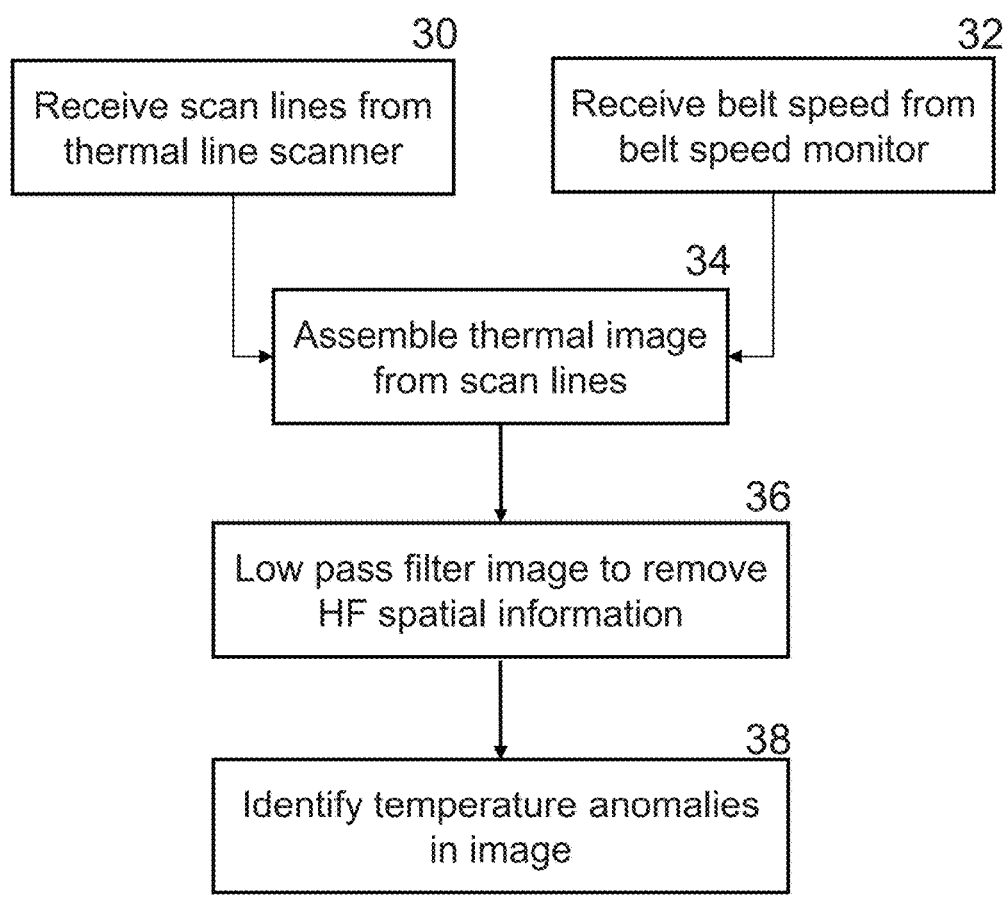
FIG. 3 is a flow diagram illustrating a process for identifying temperature anomalies in thermal images captured by the system of FIG. 1.
Figure 4:
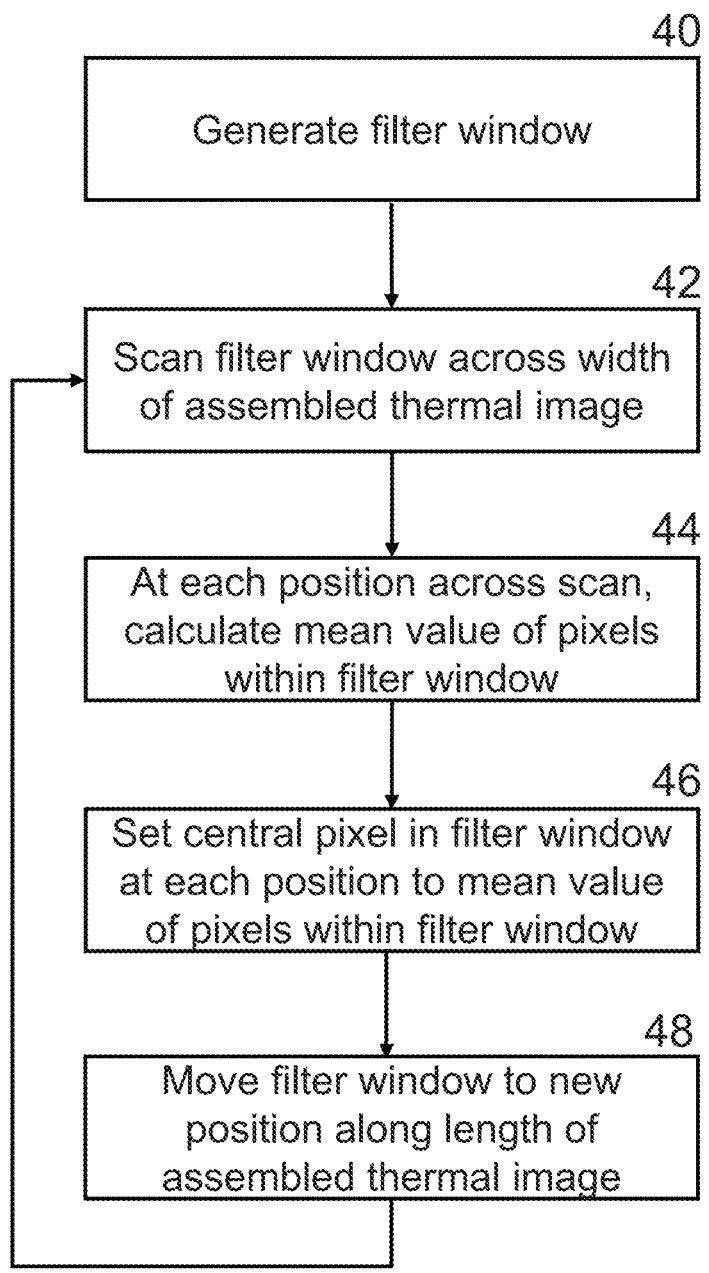
FIG. 4 is a flow diagram illustrating a process for filtering an image captured by the system of FIG. 1.

Referring now to FIG. 4, the filtering step 36 shown in FIG. 3 will he described. A filter window is first generated at step 40. The dimensions of the filter window may be set by a user of the conveyor belt anomaly detection system 10, for example using the input device 24. In some embodiments, the filter window dimensions are set to be equal to the minimum size of anomaly that a user wishes the system 10 to detect. For example, a user may input to the processing unit 14 a length and width or area of the minimum size anomaly to be identified and this data is then used to specify the length and width of the generated filter window. Anomalies having smaller dimensions than those of the filter window are thus removed in the filtered image.

Once generated, the filter window may be scanned across the width of the assembled thermal image. At each position in the scan, the mean value of the pixels within the filter window is calculated (step 44). The central pixel in the filter window at each of position in the scan is then set to the mean value of pixels within that filter window calculated for that position.

Once the filter has reached the end of the width of the image, at step 4$, the filter window is translated to the next non-filtered portion of the image and the process returns to step 42, the filter window being scanned across the width of the assembled thermal image. The process repeats until no further image data needs to be filtered e.g. when the conveyor belt stops or the system is switched off.

The result is a filtered thermal image in which high frequency spatial information has been removed. In other words, small anomalies which are hotter than the high temperature threshold, or colder than the low temperature threshold, but which are smaller than the filter window, are removed. These small anomalies are thus not visible when the filtered image is searched for temperature anomalies. Larger anomalies, however, remain visible to the search. Additionally, in the case of a temperature anomaly which is at least as large as the minimum size being searched for, having a few pixels which lie outside the temperature threshold does not prevent detection of that anomaly so long as the remaining pixels making up the anomaly lie sufficiently beyond the threshold so as to compensate and take the mean value for the filter window past the threshold. A straightforward temperature threshold can be applied to the filtered thermal image without false alarms being generated due to anomalies smaller than the specified user threshold.

Figure 5:
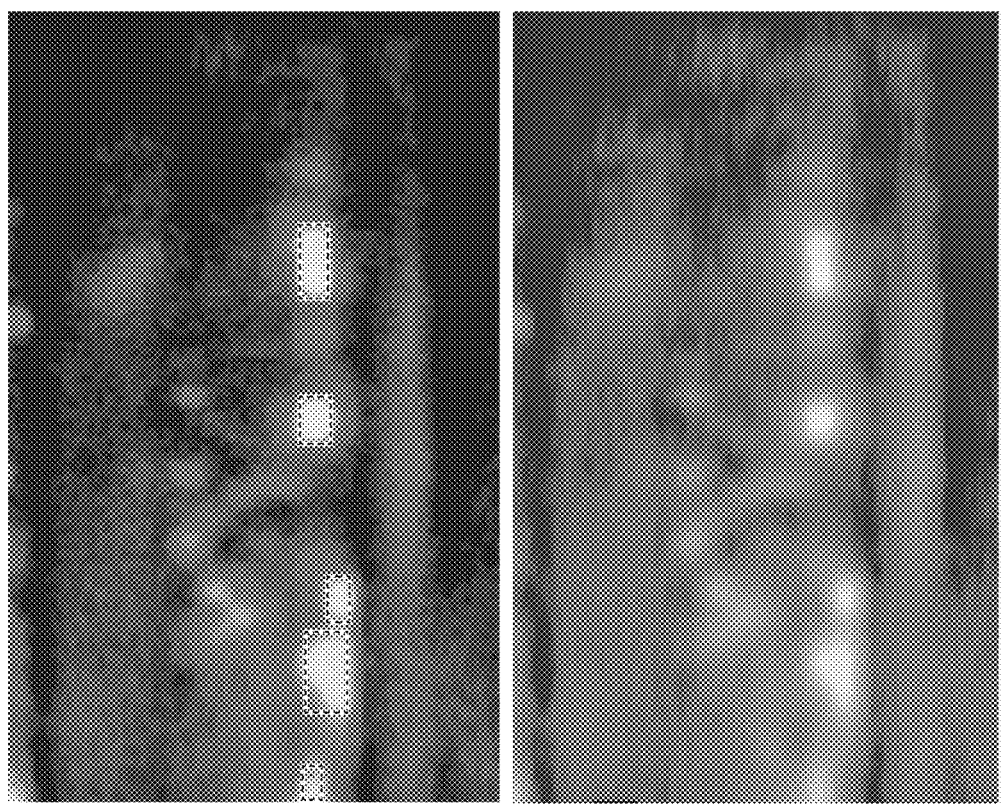
FIG. 5 is a graphical depiction of thermal images acquired by the system of FIG. 1 before and after filtering using the process of FIG. 4.

FIG. 5 shows thermal images before (left) and after (right) the above filtering process, in which edges of anomalies are blurred and small temperature anomalies have been removed.

It will be appreciated that the above filtering step is not essential. However, by performing this step, the overall efficiency of the system 10 is increased since anomalies having dimensions less than the threshold set by a user, e.g. areas having very few high-value or low-value pixels, do not show up in the filtered image and so are not present for the subsequent anomaly search. Any pixel in the filtered image which exceeds the threshold value should be part of a genuine anomaly.

It will be appreciated that alternative methods for low pass filtering are known in the art and may be used instead of the above. For example a weighted average may be calculated within the filter window so that the central pixels contribute more to the output value than the pixels at the edges or in the corners of the window. In which case, per-pixel weight values could be calculated, the outcome being similar to the mean value method above. The selection of a weighted or un-weighted filter may be dependent upon factors such as whether the anomalies being sought are expected to have a uniform temperature or not, and whether the intention is to detect faults in the material on the belt or to protect the belt itself from temperature-induced damage. Such methods do not fall outside the scope of the present invention.

Figure 6:
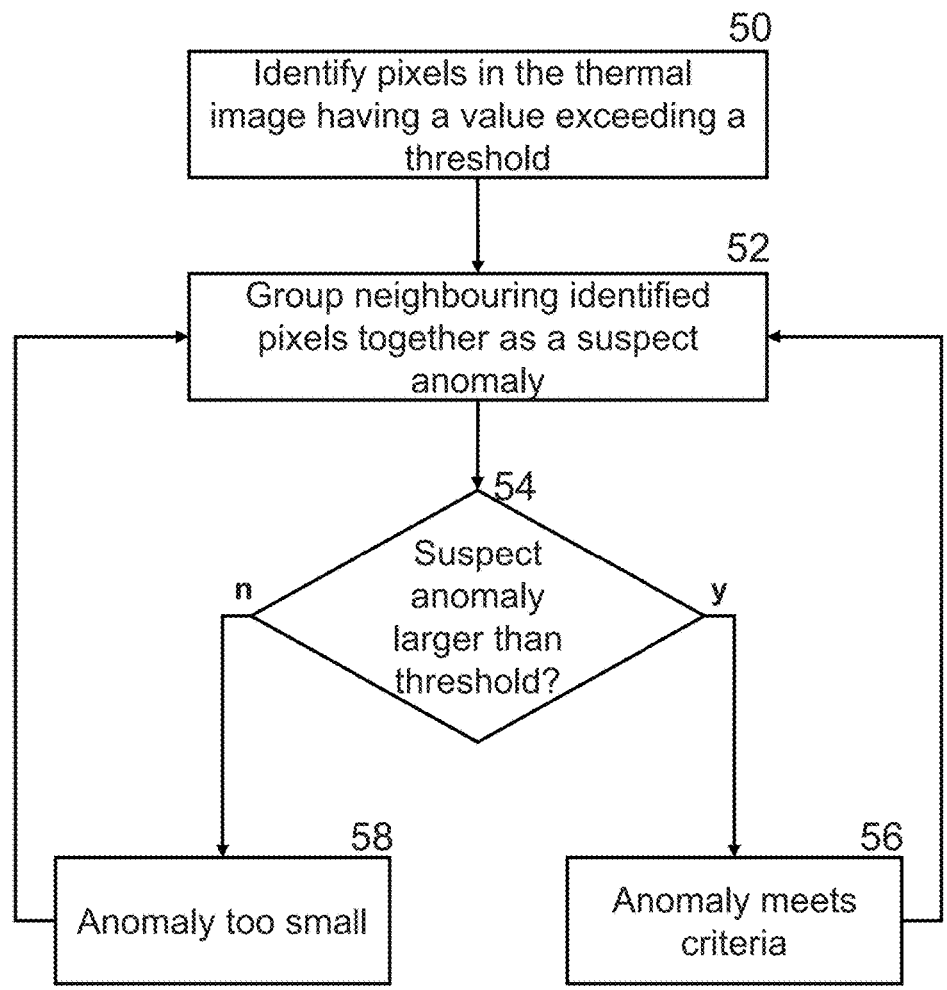
FIG. 6 is a flow diagram illustrating a process for identifying anomalies in images captured by the system of FIG. 1.

Referring back to FIG. 3, once the thermal image has been assembled and optionally filtered at step 36, at step 38 the thermal image may be processed to identify pixels and groups of pixels which correspond to areas of material travelling over the conveyor belt 16 which have an anomalously high (or low) temperature. FIG. 6 illustrates a process flow for identifying such anomalies. At step 50, pixels are identified in the thermal image that have a value which exceed a predetermined temperature threshold. This temperature threshold may be set by a user and may be an absolute temperature. Alternatively, the threshold may be set as a difference between a maximum pixel value and an average pixel value for the thermal image. In some embodiments, the rate of change of the temperature within an identified area may be monitored and thresholds set based on these characteristics. Additionally or alternatively, the temperature difference between different parts of a linear target may be used. For example, the temperature difference between the centreline and the edges of steel strips in a rolling mill could be used as thresholds for temperature anomalies.

Pixels in the image which are identified as having a value which exceeds the threshold are then grouped together at step 52. Grouping may be achieved by considering neighbouring pixels to be part of the same anomaly. To consolidate the number of detected features, pixels which lie close together but not touching may be considered as belonging to the same anomaly and thus also grouped together. This may be achieved by reducing the resolution of the filtered image, by peak or valley picking either the hottest of the coldest pixels in a small region, thus forming a single, reduced resolution pixel. Immediately neighbouring pixels in this reduced resolution image may then belong to a single consolidated anomaly which can be combined with other reduced resolution pixels and/or pixels which are immediate neighbours with any of the higher resolution pixels making up any of the reduced resolution pixels.

At step 54, for each suspect anomaly which has been detected, i.e. each group of pixels which are suspected of making up the same anomaly, dimensions are calculated and compared to a threshold size, also set by a user. If the threshold criteria are reached by the suspect anomaly, then at step 56 the suspect anomaly is considered to meet the threshold criteria and data pertaining to that anomaly may be stored for further analysis. Alternatively, if the suspect anomaly is considered to be of lesser size than that required by the threshold criteria then the anomaly is be disregarded at step 58. This process repeats for each pixel or group of pixels having a value exceeding the threshold criterion. If the step of low pass filtering has been performed previous to this step, there is no need to check whether or not the anomaly is of sufficient dimensions since anomalies smaller than the threshold are removed during the filtering step. In such circumstances, steps 54, 56 and 58 may be skipped.

Figure 7:
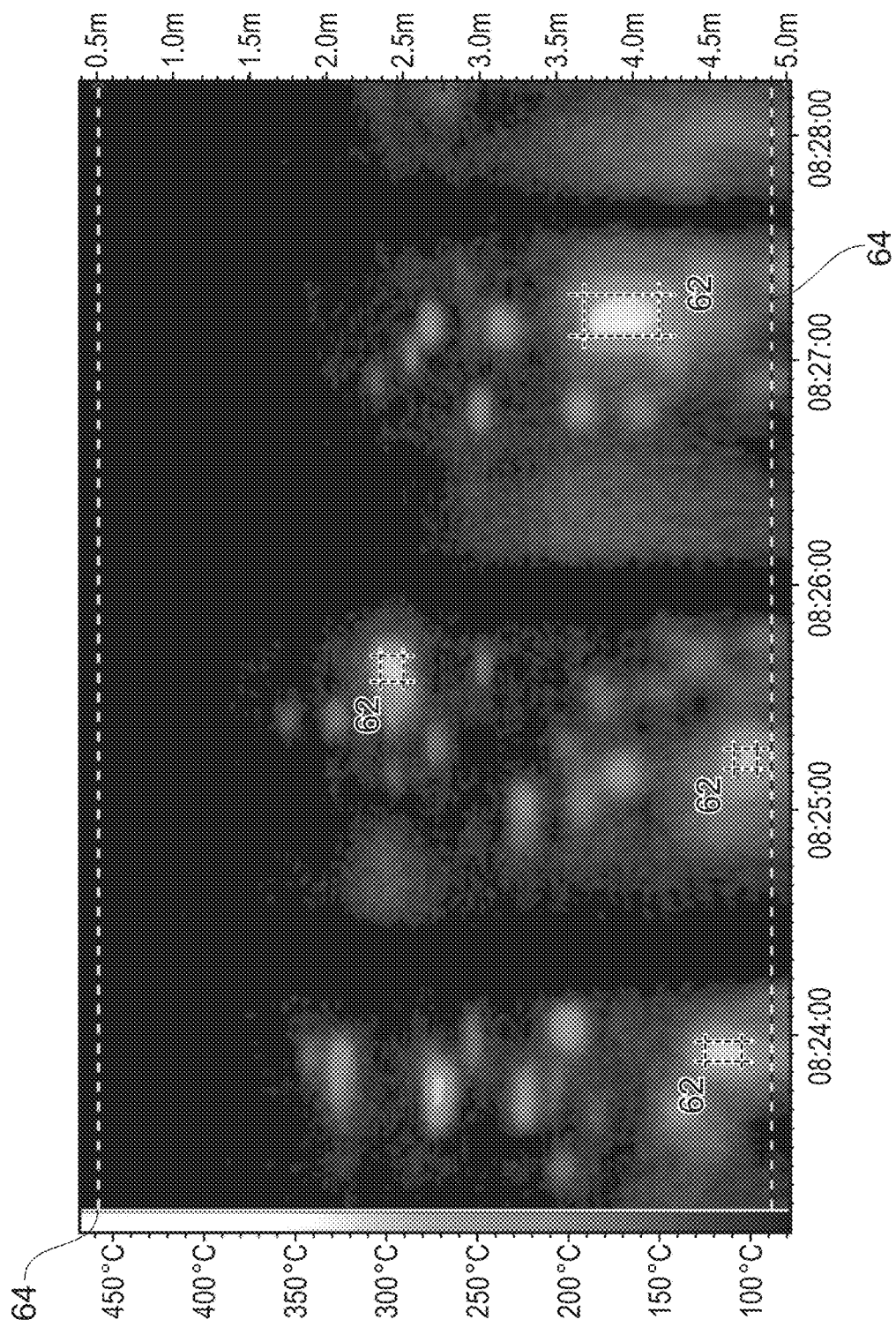
FIG. 7 is a graphical depiction of a thermal image acquired by the system of FIG. 1 in which anomalies have been identified by dotted lines.

During the detection and analysis of the thermal image data by the processing unit 14, some or all of the images generated may be displayed on the display 26 coupled to the processing unit 14. For example, the display 26 may show images before and after low pass filtering. Additionally or alternatively, upon detection of an anomaly within the thermal image, one or more markers may be super imposed on the image to indicate to the user where anomalies occur on the belt 16 and which of those meet the threshold criteria etc. FIG. 7 shows an example thermal image generated by the processing unit 14 which may be displayed to the user. Temperature variation are shown by colour variations in the image (shown in black and white in the representation in FIG. 7); darker areas of the image representing cold areas of the conveyor belt and brighter areas of the image representing hot areas of the conveyor belt. In this embodiment the square boxes have been drawn around anomalies which have been found to satisfy the requirements of the threshold criteria set by the user. These thresholds are set to identify hot spots 62 in the material travelling over the conveyor belt 16. As explained above, however, embodiments of the present invention may additionally or alternatively identify cold spots within thermal images.

In addition to visually identifying temperature anomalies in a thermal image, the system 10 may include one or more alarms configured to trigger upon detection of a temperature anomaly which meets the threshold conditions set by the user. These alarms may be audible or visual alarms, for example, a siren or flashing light so as to bring an anomaly to the attention of a user. Alarms may be presented to a user via the display 26 in the form of, for example, an on-screen notification. Such notifications may be visually attached in some manner to an anomaly shown in the thermal image, also on-screen.

In response to an alarm condition, the processing unit 14 may generate an output signal to trigger an external event, such as a halt of the movement of the belt etc. The output signal may be in the form of a 4-20 mA output signal or an OPC (object linking and embedding for process control) compatible signal. OPC may also be used by the processing unit 14 to interface with additional sensors and monitors (e.g. the conveyor belt speed monitor 22) to receive additional data from the conveyor belt 16 and any other associated devices. OPC may also be used to interface the conveyer belt monitoring system 10 to other process control and instrumentation systems used throughout a plant in which the monitoring system 10 is installed. Additionally, the monitoring system 10 may interface with knowledge management system such as Knowledge Manager from ABB.

Different alarms may be implemented for different thresholds or criteria. Additionally or alternatively, alarm criterion may be set that require the presence of a predetermined number of detected anomalies within a region of interest, e.g. the most recently scanned section of the belt up to a user-specified distance away from the scanning point.

An alarm database may be maintained to store details of each alarm event, including recorded conveyor data and any other data received by the processing unit at the time of the alarm. As such alarm events can be later reviewed and analysed.

In the embodiments described above, a single set of threshold criteria are applied to the received image data meaning that only temperature anomalies meeting that single set of threshold criteria are identified. In other embodiments, however, multiple filters with different criteria can be applied to the same input data so that temperature anomalies having different characteristics can be identified in the same image. For example, a first filter may be set to identify hot spots/areas in material passing over the conveyor belt 16 and a second filter may be configured to identify cold spots in material passing over the conveyor belt 16.

In addition to applying multiple filters each having different criteria, in some embodiments, the area of the thermal image being processed may be pre-set. FIG. 7 shows a pair of boundary lines 64 used to denote the area of the image in which to identify anomalies. Areas outside the boundaries 64 are not analysed. Such boundaries may be set, for example, where the width of the scan of the line scanner 12 is wider than the belt. The boundary lines may prevent areas outside of the belt 16, such as metal side rails, electric motors etc., from being included in the anomaly identification process. Such features may cause undesirable effects to the calculations performed during image processing. By cropping out undesired areas of the image, these features do not affect the outcome of the threshold analysis performed by the processing unit 14. Additionally, in some embodiments, two conveyor belts may be imaged in parallel using a single line scanner. The scanner 12 would then scan the width of the two belts. In which case, it may be desirable to analyse the material travelling on one belt at a time. Boundaries can be set around the area of the belt requiring analysis and the processes described in FIGS. 3, 4 and 6 performed only on that area for particular criteria specified.

In some plant configurations the line of sight of the line scanner may be obstructed. In any of the above described embodiments one or more additional line scanners may be positioned to ensure a completely unobstructed view the conveyor belt 16. For example, multiple scanners may be configured to view the belt 16 from different angles. Infrared data generated by each scanner may then be processed and combined to present a single stream of scan data. Scan data from the optimally positioned line scanner (i.e. the lines scanner with the clearest view of the belt 16) may then be selected and used for thermal imaging to avoid any obstruction and thus achieve the highest resolution. Spot pyrometers may also be used in addition or as an alternative to the one or more additional line scanners in the case of obstructions that cause interference from view.

In embodiments described above, a line scanner having one or more infrared detectors is provided to scan the width of the belt. In any of the above described embodiments, the line scanner may be replaced with a thermographic camera (such as an infrared camera) configured to thermally image material passing along the belt. The thermographic camera may comprise a two dimensional array of infrared detectors directed toward the belt. Accordingly, a two dimensional scan or image of the belt can be performed and the received image data can be used by the processing unit 14 to generate the thermal image of material on the belt. The thermographic camera may transmit data to the processing unit 14 in the form of image frames for processing, or the processing unit 14 may itself generate image frames and subsequently process them.

In some of the embodiments described above, a belt speed monitor 22 provides an indication of belt speed to the processing unit 14. Whilst the provision of a belt speed monitor 22 is preferable, in other embodiments, instead of using the belt speed monitor 22, analysis of the tracking of hot or cold spots in the thermal image could be used to measure the speed of the belt. For example, the distance an anomaly travels over a set period of time can be calculated in realtime, and thus the speed of the belt determined at any particular time, provided at least one anomaly is present in the image. The anomaly used to determine the belt speed need not be above the threshold required for identification or an alarm event.

What is claimed is:

1. A conveyor belt temperature anomaly detection system, comprising:
    an infrared line scanner having one or more infrared detectors and arranged to scan the surface of a conveyor belt in a direction perpendicular to the direction of travel of the conveyor belt and to generate thermal image data in dependence on infrared radiation detected by the infrared detector; and
    a processing unit configured to perform processing operations to process the thermal image data to identify temperature anomalies in the material travelling on the surface of the conveyor belt, the processing operations including:
        receiving a plurality of scan lines from the infrared line scanner, the scan lines comprising a plurality of pixels each having a pixel value corresponding to a temperature of the material detected at that pixel;
        assembling a thermal image of the conveyor belt from the plurality of scan lines, the thermal image made up of the plurality of pixels;
        filtering the image to remove high frequency spatial information from the image to remove small temperature anomalies from the thermal image; and
        identifying, in the thermal image, groups of pixels having anomalous pixel values corresponding to temperature anomalies in the material.

2. The conveyor belt temperature anomaly detection system of claim 1, wherein the filtering comprises:
scanning a filter window over the thermal image; and
at each scan position of the filter window, calculating a filtered pixel value for the pixel centred in the filter window, the filtered pixel value equal to one of:
a) the value of a mean of the pixels within the filter window; and
b) the value of a weighted average of the pixels within the filter window.

3. The conveyor belt temperature anomaly detection system of claim 2, wherein the dimensions of the filter window correspond to the minimum dimensions of anomalies to be detected by the belt.

4. The conveyor belt temperature anomaly detection system of claim 2, wherein the weighting of the weighted average is such that pixels closer to the centre of the filter window contribute more to the filtered pixel value than pixels further away from the centre of the filter window.

5. The conveyor belt temperature anomaly detection system of claim 1, wherein the identifying comprises:
selecting first pixels in the thermal image having a pixel value exceeding a first predetermined threshold temperature; and
grouping neighbouring or near neighbouring selected first pixels together.

6. The conveyor belt temperature anomaly detection system of claim 5, wherein the identifying further comprises:
selecting second pixels in the thermal image having a pixel value exceeding a second predetermined threshold temperature; and
grouping neighbouring or near neighbouring selected second pixels together.

7. The conveyor belt temperature anomaly detection system of claim 6, wherein the identifying further comprises determining whether each group of first pixels has size greater than a first predetermined threshold size and/or determining whether each group of second pixels has a size greater than a second predetermined threshold size.

8. The conveyor belt temperature anomaly detection system of claim 1, further comprising an input for receiving an indication of conveyor belt speed from the conveyor belt, wherein the thermal image is assembled in dependence on the received conveyor belt speed indication.

9. The conveyor belt temperature anomaly detection system of claim 1, further comprising a display operable to display the thermal image data and one or more indications of the identified temperature anomalies in the thermal image.

10. The conveyor belt temperature anomaly detection system of claim 9, wherein the one or more indications comprise lines drawn around the anomalies in the thermal image.

11. The conveyor belt temperature anomaly detection system of claim 1, further comprising an input device for receiving threshold criteria for identifying the temperature anomalies.

12. The conveyor belt temperature anomaly detection system of claim 1, wherein the line scanner comprises a linear array of infrared detectors arranged to electronically scan the width of the conveyor belt.

13. A conveyor belt temperature anomaly detection system, comprising:
a two dimensional array of infrared detectors arranged to receive infrared radiation from the surface of a conveyor belt and to generate thermal image data in dependence on the received infrared radiation; and
a processing unit configured to perform processing operations to process the thermal image data to identify temperature anomalies in the material travelling on the surface of the conveyor belt, the processing operations including:
receiving the thermal image data from the array of infrared detectors, the thermal image data comprising a plurality of pixels each having a pixel value corresponding to a temperature value of the material detected by that pixel;
assembling a thermal image of the conveyer belt from the plurality of pixels;
filtering the image to remove high frequency spatial information from the image to remove small temperature anomalies from the thermal image; and
identifying, in the thermal image, groups of pixels having anomalous pixel values corresponding to temperature anomalies in the material.

14. The conveyor belt temperature anomaly detection system of claim 13, wherein the filtering comprises:
scanning a filter window over the thermal image; and
at each scan position of the filter window, calculating a filtered pixel value for the pixel centred in the filter window, the filtered pixel value equal to one of:
a) the value of a mean of the pixels within the filter window; and
b) the value of a weighted average of the pixels within the filter window.

15. The conveyor belt temperature anomaly detection system of claim 14, wherein the dimensions of the filter window correspond to the minimum dimensions of anomalies to be detected by the belt.

16. The conveyor belt temperature anomaly detection system of claim 14, wherein the weighting of the weighted average is such that pixels closer to the centre of the filter window contribute more to the filtered pixel value than pixels further away from the centre of the filter window.

17. The conveyor belt temperature anomaly detection system of claim 13, wherein the identifying comprises:
selecting first pixels in the thermal image having a pixel value exceeding a first predetermined threshold temperature; and
grouping neighbouring or near neighbouring selected first pixels together.

18. The conveyor belt temperature anomaly detection system of claim 17, wherein the identifying further comprises:
selecting second pixels in the thermal image having a pixel value exceeding a second predetermined threshold temperature; and
grouping neighbouring or near neighbouring selected second pixels together.

19. The conveyor belt temperature anomaly detection system of claim 17, wherein the identifying further comprises determining whether each group of first pixels has size greater than a first predetermined threshold size and/or determining whether each group of second pixels has a size greater than a second predetermined threshold size.

20. The conveyor belt temperature anomaly detection system of claim 13, further comprising an input for receiving an indication of conveyor belt speed from the conveyor belt, wherein the thermal image is assembled in dependence on the received conveyor belt speed indication.

21. The conveyor belt temperature anomaly detection system of claim 13, further comprising a display operable to display the thermal image data and one or more indications of the identified temperature anomalies in the thermal image.

22. The conveyor belt temperature anomaly detection system of claim 21, wherein the one or more indications comprise lines drawn around the anomalies in the thermal image.

23. The conveyor belt temperature anomaly detection system of claim 13, further comprising an input device for receiving threshold criteria for identifying the temperature anomalies.

24. The conveyor belt temperature anomaly detection system of claim 13, wherein the line scanner comprises a linear array of infrared detectors arranged to electronically scan the width of the conveyor belt.

25. A method for detecting temperature anomalies in material transported on a conveyor belt, the method comprising:
    scanning an infrared line scanner across the surface of the conveyor belt in a direction perpendicular to the direction of travel of the conveyor belt;
    generating thermal image data based on infrared radiation received by the infrared line scanner from the material travelling on the conveyor belt; and
    processing the thermal image data to identify temperature anomalies in material travelling on the surface of the conveyor belt, wherein the processing comprises:
        receiving a plurality of scan lines in the generated thermal image data, the scan lines comprising a plurality of pixels having pixel values;
        assembling a thermal image of the conveyor belt from the plurality of scan lines, the thermal image made up of the plurality of pixels;
        filtering the thermal image to remove high frequency spatial information to remove small temperature anomalies from the thermal image; and
        identifying, in the thermal image, groups of pixels having anomalous pixel values corresponding to temperature anomalies in the material.

26. The method of claim 25, wherein the filtering comprises:
    scanning a filter window over the thermal image; and
    at each scan position of the filter window, calculating a filtered pixel value for the pixel centred in the filter window, the filtered pixel value equal to one of:
    a) the value of the mean of the pixels within the filter window; and
    b) the value of a weighted average of the pixels within the filter window.

27. The method of claim 26, wherein the dimensions of the filter window correspond to the minimum dimensions of anomalies to be detected by the belt.

28. The method of claim 27, wherein the weighting of the weighted average is such that pixels closer to the centre of the filter window contribute more to the filtered pixel value than pixels further away from the centre of the filter window.

29. The method of claim 25, wherein the identifying comprises:
    selecting first pixels in the thermal image having a pixel value exceeding a first predetermined threshold temperature; and
    grouping neighbouring or near neighbouring selected first pixels together.

30. The method of claim 29, wherein the identifying further comprises:
    selecting second pixels in the thermal image having a pixel value exceeding a second predetermined threshold temperature; and
    grouping neighbouring or near neighbouring selected second pixels together.

31. The method of claim 29, further comprising determining whether each group of first pixels has size greater than a first predetermined threshold size and/or determining whether each group of second pixels has a size greater than a second predetermined threshold size.

32. The method of claim 25, further comprising receiving an indication of belt speed from the conveyor belt, the thermal image being assembled in dependence on the received conveyor belt speed indication.

33. The method of claim 25, further comprising receiving threshold criteria for identifying the temperature anomalies.

34. The method of claim 25, further comprising displaying, on a display, the thermal image data alongside an indication of the identified temperature anomalies.

35. The method of claim 34, wherein the indication comprises lines drawn around the anomalies in the thermal image.

36. A method for detecting temperature anomalies in material transported on a conveyor belt, the method comprising:
    directing a two dimensional array of infrared detectors toward a surface of the conveyor belt;
    generating thermal image data in dependence on received infrared radiation; and
    processing the thermal image data to identify temperature anomalies in the material travelling on the surface of the conveyor belt, wherein the processing the thermal image data comprises:
        receiving the thermal image data from the array of detectors, the thermal image data comprising a plurality of pixels each having a pixel value corresponding to a temperature value of the material detected by that pixel;
        assembling a thermal image of the conveyer belt from the plurality of pixels;
        filtering the thermal image to remove high frequency spatial information to remove small temperature anomalies from the thermal image; and
        identifying, in the thermal image groups of pixels having anomalous pixel values corresponding to temperature anomalies in the material.

37. The method of claim 36, wherein the filtering comprises:
    scanning a filter window over the thermal image; and
    at each scan position of the filter window, calculating a filtered pixel value for the pixel centred in the filter window, the filtered pixel value equal to one of:
    a) the value of the mean of the pixels within the filter window; and
    b) the value of a weighted average of the pixels within the filter window.

38. The method of claim 37, wherein the dimensions of the filter window correspond to the minimum dimensions of anomalies to be detected by the belt.

39. The method of claim 38, wherein the weighting of the weighted average is such that pixels closer to the centre of the filter window contribute more to the filtered pixel value than pixels further away from the centre of the filter window.

40. The method of claim 36, wherein the identifying comprises:

selecting first pixels in the thermal image having a pixel value exceeding a first predetermined threshold temperature; and grouping neighbouring or near neighbouring selected first pixels together.

41. The method of claim 40, wherein the identifying further comprises:

selecting second pixels in the thermal image having a pixel value exceeding a second predetermined threshold temperature; and grouping neighbouring or near neighbouring selected second pixels together.

42. The method of claim 40, further comprising determining whether each group of first pixels has size greater than a first predetermined threshold size and/or determining whether each group of second pixels has a size greater than a second predetermined threshold size.

43. The method of claim 36, further comprising receiving an indication of belt speed from the conveyor belt, the thermal image being assembled in dependence on the received conveyor belt speed indication.

44. The method of claim 36, further comprising receiving threshold criteria for identifying the temperature anomalies.

45. The method of claim 36, further comprising displaying, on a display, the thermal image data alongside an indication of the identified temperature anomalies.

46. The method of claim 45, wherein the indication comprises lines drawn around the anomalies in the thermal image.

47. A non-transitory machine-readable storage medium containing machine-readable instructions configured to cause a processor of a conveyor belt temperature anomaly detection system to perform operations for processing thermal image data to identify temperature anomalies in material travelling on a surface of a conveyor belt, the operations comprising:

receiving a plurality of scan lines of thermal image data associated with material travelling on the conveyor belt, the scan lines comprising a plurality of pixels having pixel values;

assembling a thermal image of the conveyor belt from the plurality of scan lines, the thermal image made up of the plurality of pixels;

filtering the thermal image to remove high frequency spatial information to remove small temperature anomalies from the thermal image; and identifying, in the thermal image, groups of pixels having anomalous pixel values corresponding to temperature anomalies in the material.

* * * * *